Nov. 12, 1935.  A. R. KNOEPPEL  2,020,729
METHOD OF AND APPARATUS FOR SEALING VITREOUS BODIES
Filed Jan. 27, 1934  3 Sheets-Sheet 1
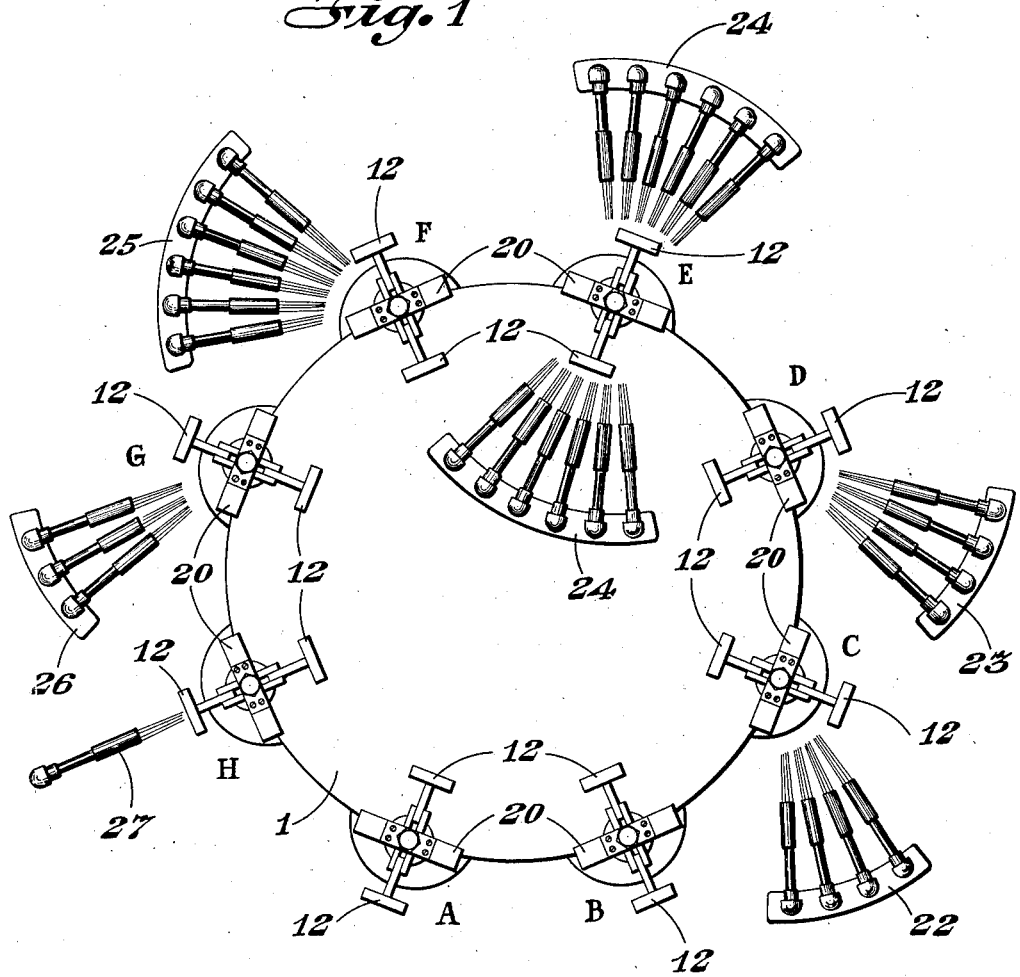
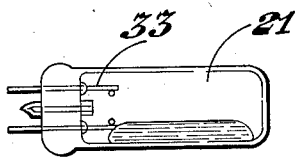
INVENTOR
Alwin R. Knoeppel
BY
Thos. H. Brown
ATTORNEY

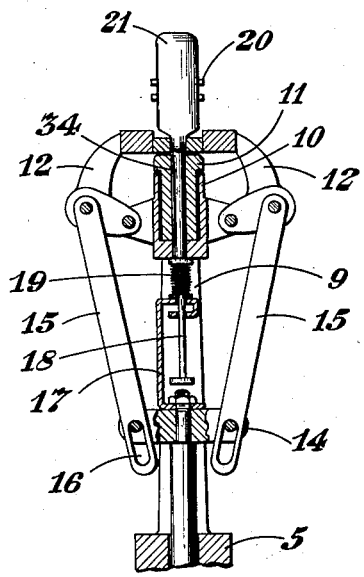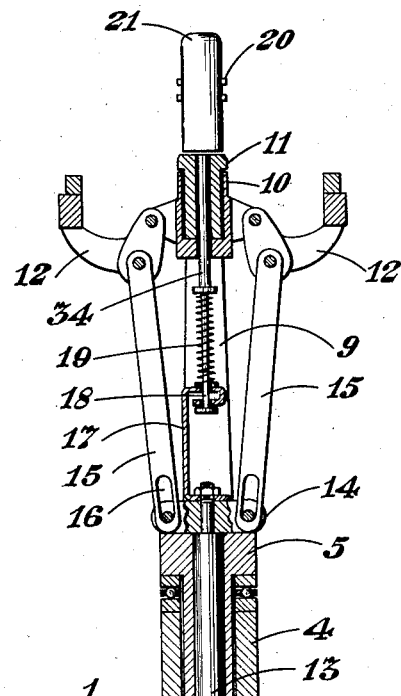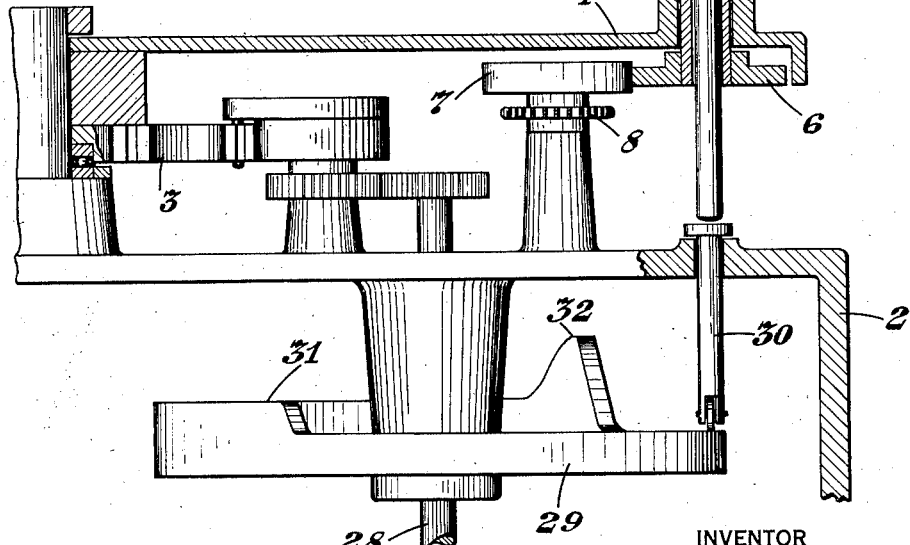

Nov. 12, 1935.  A. R. KNOEPPEL  2,020,729
METHOD OF AND APPARATUS FOR SEALING VITREOUS BODIES
Filed Jan. 27, 1934  3 Sheets-Sheet 3
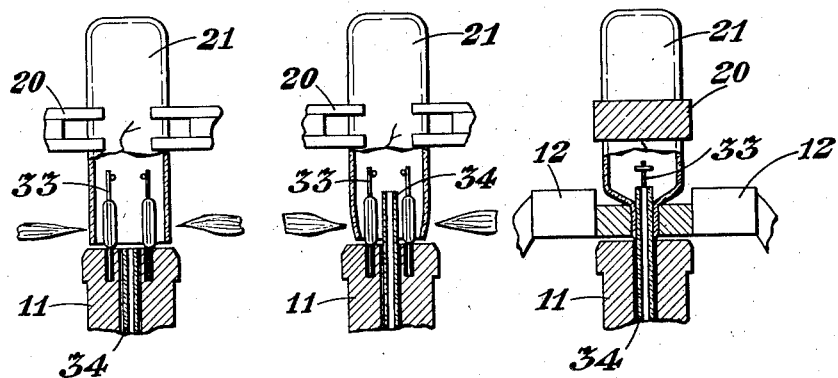
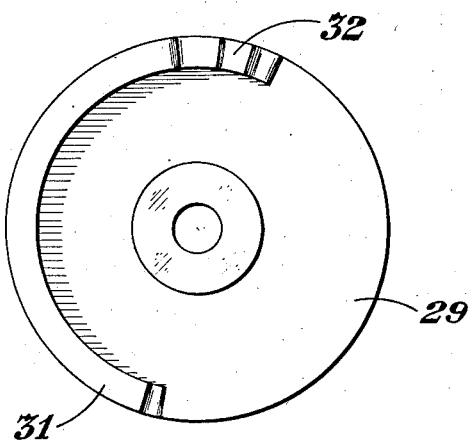
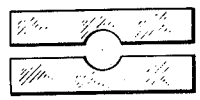 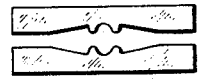
INVENTOR
Alwin R. Knoeppel
BY
Thos H Brown
ATTORNEY Patented Nov. 12, 1935

2,020,729

UNITED STATES PATENT OFFICE 2,020,729

METHOD OF AND APPARATUS FOR SEALING VITREOUS BODIES

Alwin R. Knoeppel, New York, N. Y., assignor to General Electric Vapor Lamp Company, Hoboken, N. J., a corporation of New Jersey Application January 27, 1934, Serial No. 708,676

9 Claims. (Cl. 49—2)

The present invention relates to the art of glass working, and in particular to the forming of an exhaust tubulation for a hollow glass body.

A particular object of the invention is to fuse a vitreous tube into a larger vitreous body. Another object of my invention is to provide a novel and simplified method of forming an exhaust passage extending through a pinch seal. Another object of my invention is to provide a novel apparatus for sealing an exhaust tubulation into a pinch seal. Still other objects and advantages of my invention will appear from the following detailed specification or from an inspection of the accompanying drawings.

The invention consists in the novel series of steps of the method and in a novel combination of elements, as hereinafter set forth and claimed.

In the manufacture of various types of devices, such as mercury switches, radio tubes, incandescent lamps and the like, it is frequently desirable to tubulate the glass envelope through a pinch seal which is provided about the electrical inleads. The pressure of the jaws used to produce the pinch seal according to the usual method is sufficient, however, to close any air passage through this seal, and hence various expedients have been devised heretofore to keep the desired passage open during the production of the seal. All of these expedients have involved the use of some form of mandrel of refractory material. In some cases these mandrels were removed after the seal was finished, while in other cases the mandrel was a permanent part of the seal. In the latter case the air passage is necessarily reduced for any given size of tubulation, so that this method is particularly undesirable. All of the prior methods have in addition had the common fault that they involved so much additional labor and expense that it was usually more practicable to tubulate the envelope at some other point, despite both the greater mechanical hazard to the seal-off tip and the unsightliness thereof.

I have now discovered that these difficulties may be entirely overcome in a very simple manner by a new procedure of my invention. According to my novel method of producing this combined tubulation and seal the glass tube which is to serve as the tubulation is maintained at a temperature considerably below the fusing point while the glass envelope is being heated to the fusing temperature. Just before the glass envelope is pinched down onto the inleads the tubulation is placed in position to be pinched into the seal. As a result of this novel procedure the tubulation in effect serves as its own mandrel, resisting the pressure of the pinching jaws and preventing the closing of the air passage through said tubulation. The glass of the envelope fuses down about this tubulation and about the electrical inleads, producing a perfect tubulated pinch seal. The seal is then preferably further heated to bring the entire mass to a temperature slightly above the annealing temperature thereof in order to prevent the formation of strains. During this heating there is, of course, little tendency for the air passage to close up, since the glass is not particularly plastic at this temperature and no pinching pressure is exerted thereon. This novel method may be practiced, of course, either by hand or by any other suitable means. I prefer, however, to employ a novel mechanism of my invention wherein the various steps are automatically carried out in the desired sequence, producing uniformity in the finished product at a minimum of expense. In this novel mechanism the glass tubulation is retained within the die block, out of the zone of the fires, until a brief interval before the seal is to be pinched. Then it is automatically moved to the desired position within the envelope and the glass pinched down thereon.

For the purpose of illustrating my invention I have shown in the accompanying drawings a preferred embodiment of my novel apparatus for producing a tubulation through a pinch seal according to my novel method, together with an example of the product thereof. In these drawings Fig. 1 is a plan view of my novel apparatus, Fig. 2 is a sectional elevation of a part of the machine, showing the novel details of the revolving head, Fig. 3 is a similar view of the revolving head showing the parts in a different position, Figs. 4 to 6 are details in part section showing three successive steps in forming the combined seal and tubulation, Fig. 7 is a plan view of the cam which controls the execution of these steps, Figs. 8 and 9 are plan views of alternative forms of pinching jaws, and Fig. 10 is a view of a completed mercury switch having a combined seal and tubulation produced according to my invention.

As shown in these drawings my novel apparatus consists of a conventional turret type glass working machine which has been modified in certain important particulars to carry out the steps of my novel method. The conventional turret 1 is mounted in the usual manner on the machine base 2 and is rotated with a step-by-step motion by means of a Geneva gear 3. A plurality of bosses 4 are arranged along the outer edge of the turret opposite the rest positions of said Geneva gear. In each of said bosses 4 there is journaled a sleeve 5 having a shoulder thereon which rests upon a suitable bearing on the upper end of each boss 4. At the lower end of each sleeve 5 there is a disc 6 which is adapted to frictionally engage in turn with each of a series of driving wheels 7 which are located at the rest positions C to H inclusive (Fig. 1). Said driving wheels 7 each have a sprocket 8 associated therewith whereby they are continuously rotated by means of a suitable chain drive (not shown). Extending upwardly from each sleeve 5 are a pair of spaced support members 9 which carry between them at their upper end a counterbored block 10 in which there is positioned a die block 11. A pair of pinching jaws 12 are likewise hinged to said block 10 in the usual manner. A push rod 13 which extends through the sleeve 5 carries a crosshead 14 which is in turn connected by means of links 15 to the aforesaid pinching jaws 12. Said links 15 each have a slot 16 therein at the lower end thereof which engage with suitable pins in the crosshead 14, whereby said crosshead can move upwardly for a predetermined distance without operating the pinching jaws. The cross-head 14 likewise carries an upwardly extending support 17 which at its upper end is bent to serve as a guide for a vertical rod 18 having suitable stops at each end thereof. A light compression spring 19 which is positioned between the support 17 and the upper stop of said rod 18 tends to maintain said rod at its upper limit of travel. A pair of clamping jaws 20 which are entirely conventional in form are mounted on the supports 9 in a suitable manner (not shown) and serve to retain the glass bulb 21 in the desired position.

A set of gas jets 22 are so positioned as to impinge upon the lower end of the bulb 21 which is at the rest position C, while a similar set 23 is located at the rest position D. At position E there are two sets of jets 24. At rest position F there is another set of jets 25, at position G there is a smaller set of jets 26, and at rest position H there is a single jet 27 which is directed at the very base of the seal, adjacent to the tubulation.

Provision is made at rest position E to operate the push rods 13. A shaft 28 which is journaled in a boss in the base 2 has a cam wheel 29 mounted thereon below said base. The edge of said cam wheel, along which the cam surface extends, is directly below the push rod 13 which is at said rest position E. A rod 30 extends through the base 2 and continuously rests upon the cam surface of said cam wheel 29, while the upper end thereof is adapted to engage the push rod 13 which is at rest thereabove. As shown the cam wheel 29 is connected to the indexing member for the Geneva gear 3 in such fashion that it makes one complete revolution for each step of the turret 1. At the instant said turret rotates the cam surface on the cam wheel 29 is low enough to drop the rod 30 out of contact with the push rods 13. Approximately 180° in the direction of rotation said cam wheel has a raised surface 31 which moves said rod 30 into contact with the push rod 13 and then moves said push rod upward a short distance. Said surface 31 extends for a little less than 180° further in the same direction, at which point there is a sudden rise 32 of short duration which causes the push rod 13 to be lifted still further In the use and operation of this machine to carry out my novel method to produce a mercury switch or the like a pair of beaded inleads 33 are placed in a die block 11 at either of the loading and unloading positions A or B. A tubulature 34 is also placed in said die block, the lower end of this tubulature resting on the upper end of the rod 18 while the upper end of said tubulature is substantially flush with the top of said die block. A bulb 21 is then positioned in the jaws 10 20 with the lower end thereof slightly above the die block 11, as shown in Fig. 1. As the turret 1 moves this loaded head to position C the head begins to rotate and flames from the jets 22 impinge on the lower edge of the bulb 21, this heating being continued at position D, where flames from the jets 23 are directed to the same part of the bulb. At position E, where the parts are initially in the position shown in Fig. 2, the bulb 21 is brought into the intense heat of the flames from the jets 24 whereby the edge of the envelope 21 is so softened that it begins to contract under the influence of the surface tension. At about this instant the surface 31 of the cam wheel 29 engages the rod 30, forcing the push rod 13 upward for a short distance. This movement of the push rod carries the crosshead 14 upward, but the pins therein merely move the length of the slots 16 in the links 15, so that said links and the pinching jaws 12 connected therewith are not operated. The support 17 carries the rod 18 upwardly therewith, however, together with the tubulature 34 supported thereon, until the enlarged head on said rod engages the lower end of the block 10, any further movement of said support 17 thereupon resulting only in a slight compression of the spring 19. The tubulature 34 now passes through the zone of the pinch seal, as clearly shown in Fig. 5. The heating of the glass in this zone then continues for several seconds, during which the tubulature is heated sufficiently to permit fusion of the glass bulb 21 thereto, but not enough to materially soften it. The surface 32 on the cam wheel 29 then engages the rod 30, and thus forces the push rod 13 still further upward. This further movement of the push rod 13 and crosshead 14 moves the links 15 upwardly, forcing the jaws 12 into the pinching position, and likewise moves the support 17 upward. Movement of the latter merely results in further compression of the spring 19, however, due to the fact that the end of the rod 18 is already against the block 10. The parts now occupy the positions illustrated in Figs. 3 and 6. Due to the relatively cold glass of the tubulature 34 the glass of the bulb 21 is pinched down thereabout to form a perfect seal without closing the air passage in said tubulature to the slightest degree. As the surface 32 on said cam passes the rod 30 the pinching jaws 12 are released and the head is then moved on to position F, where the seal is subjected to a relatively hot fire from the jets 25, by which the entire mass is heated to a temperature slightly above the annealing temperature of the glass employed, since this has been found to prevent the formation of strains in the seal. During this heating the air passage does not close, both because the glass is not particularly plastic at this annealing temperature, and because no pressure is exerted thereon at this stage in the operation. At the next succeeding rest position G the seal is heated by the smaller flames from the jets 26, which prevent too rapid cooling thereof. At position H a small flame is directed from the jet 27 to the point where the tubulature 34 emerges from the seal to further control the rate of cooling of this part of the seal, although this step is omitted in some cases.

While pinching jaws having plane surfaces are ordinarily employed to make the pinch seal I have found that in some cases, as where very large inleads or tubulatures are used, better results can be obtained by the use of shaped jaws, such as shown in Figs. 8 and 9. With either of these jaws provision is made to pinch the glass around the tubulature, and in that of Fig. 9 they are shaped around the inleads as well.

My novel method, which can obviously be performed by hand as well as by the machine illustrated, permits the simple and inexpensive production of a mercury switch, such as shown in Fig. 10, the mercury being readily inserted and the device evacuated through the air passage left when the seal is produced in this manner.

I have found by experiment that this novel method may be employed with either the so-called hard glasses (borosilicate or the like) or with the softer lead or lime glasses, although somewhat more care in annealing is necessary with the latter. I have also found that the instant at which the tubulature is moved into the heating zone is not particularly critical, there being a considerable temperature range for said tubulature within which satisfactory results may be attained.

While I have described my invention by reference to a specific machine and mode of operation, it is obvious that it is not limited thereto, but that various changes, omissions, and substitutions, within the scope of the appended claims, may be made therein without departing from the spirit thereof. In particular it may be noted that my novel method can be employed with equal facility regardless of whether the bulb 21 is closed at the opposite end or not. In fact my novel method and apparatus is of value for the simple joining of two tubes or the like of unlike diameter, and it is intended that it should be so used where desired.

I claim as my invention:

1. The method of sealing a vitreous tube into a vitreous body having an open end of larger diameter than said tube which comprises heating the end of said body to its softening temperature then inserting the end of said tube within the heated end of said body, continuing to heat the end of said body to its fusing temperature, and then pinching the fused end of said body into contact with said tube.

2. The method of producing a tubulated vitreous envelope which comprises positioning an open end of said envelope about an inlead, heating said envelope to its softening temperature, then inserting a tubulature within the heated end of said envelope, continuing to heat said envelope to its fusing temperature, and then pinching the fused end of said envelope into contact with both said tubulature and said inlead to form a tubulated pinch seal.

3. The method of sealing a vitreous tube into a vitreous body having an open end of larger diameter than said tube which comprises heating the end of said body to a fusing temperature while maintaining the temperature of said tube below the temperature at which the walls thereof are appreciably plastic, pinching the fused end of said body into contact with said tube, and thereafter raising the vitreous mass which has been pinched together to a temperature slightly above the annealing temperature thereof.

4. In glass working apparatus, in combination, means to support an open-ended vitreous body, means to apply fusing heat to the end of said body, means to support a vitreous tube adjacent to said body, means to shield said tube from said heat, means to move said tube within the heated end of said body, and means operable after said tube moving means has reached its limit of travel to pinch the end of said body into contact with said tube.

5. In glass working apparatus, in combination, means to support an open-ended vitreous body, means to apply fusing heat to the end of said body, means to support a vitreous tube out of registry with the open end of said body, means to move said tube within the softened end of said body, and means operable after said tube moving means has reached its limit of travel to pinch the end of said body into contact with said tube.

6. In glass working apparatus, in combination, means to support an inlead, means to support an opened vitreous body about said inlead, means to apply fusing heat to the end of said body, means to support a vitreous tube out of registry with said body, means to move said tube within the softened end of said body, and means operable after said tube moving means has reached its limit of travel to pinch the end of said body to form a seal about said inlead and about said tubulature.

7. In glass working apparatus, in combination, a die block adapted to retain an inlead, means to support an open-ended vitreous body above said die block, means to apply fusing heat to the end of said body, means to support a vitreous tube within said die block with the end thereof substantially flush with said die block, means to raise said tube above said block, and means operable after said tube moving means has reached its limit of travel to pinch the end of said body to form a seal about said inlead and said tube.

8. In glass working apparatus, in combination, means to support an open-ended vitreous body, means to apply fusing heat to the end of said body, means to support a vitreous tube out of registry with the open end of said body, means to move said tube within the softened end of said body after a predetermined interval, and means operable after said tube moving means has reached its limit of travel to pinch the end of said body into contact with said tube.

9. In glass working apparatus, in combination, means to support an open-ended vitreous body, means to apply fusing heat to the end of said body, means to support a vitreous tube adjacent to said body, means to shield said tube from said heat, means to move said tube within the heated end of said body, means to pinch the end of said body into contact with said tube and means to raise the vitreous mass which has been pinched together to a temperature slightly above the annealing temperature thereof, and means effective thereafter to control the cooling rate of said vitreous mass.

ALWIN R. KNOEPPEL.